United States Patent [19]

Weaver

[11] 3,929,772
[45] Dec. 30, 1975

[54] DYE INTERMEDIATES

[75] Inventor: Thomas Dean Weaver, Rochester, N.Y.

[73] Assignee: E. I. Du Pont de Nemours & Co., Wilmington, Del.

[22] Filed: June 4, 1974

[21] Appl. No.: 476,318

[52] U.S. Cl............................ 260/240.4; 260/307 A
[51] Int. Cl.².............. C07D 261/00; C07D 413/14
[58] Field of Search.......... 260/240.2, 240.4, 307 A, 260/240 F, 240 E

[56] References Cited
UNITED STATES PATENTS
3,455,947   7/1969   Seefelder......................... 260/240 E FOREIGN PATENTS OR APPLICATIONS
673,529   11/1963   Canada.......................... 260/240 E
47-29511   5/1969   Japan............................. 260/307 A
438,603   11/1935   United Kingdom.............. 260/240.6

OTHER PUBLICATIONS
Index Chemicus, 112,916 (1969) Vol. 33, Issue 288, 260–240F.

*Primary Examiner*—Allen B. Curtis

[57] ABSTRACT

Dye intermediates having the formula

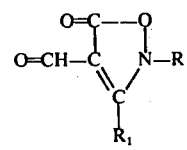

wherein R is selected from alkyl, alkaryl, and aryl, and $R_1$ is selected from alkyl, alkaryl, aryl, and hydrogen. Methods for preparing these compounds, and the preparation of merocyanine and quaternated cyanine dyes employing these compounds, are described.

10 Claims, No Drawings

DYE INTERMEDIATES

BACKGROUND OF THE INVENTION

This invention relates to N-substituted-4-formyl-3-isoxazolin-5-ones and the preparation of merocyanine dyes employing these compounds. Cyclic dye-forming compounds and, in particular, 2-isoxazolin-5-one, have been described as dye intermediates in Eldredge and Mee, U.S. Pat. No. 3,674,782, Brooker and Van Lare, U.S. Pat. No. 3,431,111, and Brooker and Webster, U.S. Pat. No. 3,539,349. Such compounds of the prior art are reacted with other dye-forming intermediates such as an imidazo [4,5-b]-quinoxaline salt to form cyanine dyes, which are then quaternized to form the desired quaternated mercocyanine dyes.

It is an object of this invention to provide novel dye intermediates which provide an advantageous route to quaternated merocyanine dyes having an amidinium ion system and to merocyanine dyes having an amidic system, and a new preparation method for such dyes.

SUMMARY OF THE INVENTION

It has been found that quaternated merocyanine dyes can be formed in a single step reaction with dye intermediates having the formula:

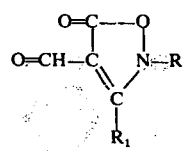

wherein R is selected from alkyl, alkaryl, and aryl and $R_1$ is selected from alkyl, alkaryl, aryl and hydrogen. These new dye intermediates condense with a quaternary salt of a cyanine dye-forming nucleus or the base thereof containing active methyl or methylene groups to form directly a quaternated cyanine dye which has the amidinium-ion system as described in Mees-James, The Theory Of The Photographic Process, Third Edition (1966), page 201, MacMillan Company, New York. A subsequent quaternizing reaction is therefore not necessary. This is particularly advantageous since some dyes cannot be formed by methods of the prior art due to the tendency towards quaternization of other reactive sites in the same molecule. The dye intermediates of the invention can also be condensed with cyanine dye forming nuclei containing active methyl or methylene groups to form cyanine dyes.

DESCRIPTION OF THE PREFERRED EMBODIMENTS

The compounds of the invention may have substituents R and $R_1$ selected from alkyl, especially lower alkyl groups of from 1–4 carbon atoms (e.g., methyl), alkaryl (e.g., benzyl and phenylethyl), and aryl (e.g., phenyl and p- and o-tolyl). $R_1$ may additionally be hydrogen. It is particularly preferred that R be alkyl, especially lower alkyl of 1-4 carbon atoms, and $R_1$ be aryl, as in the case of 4-formyl-2-methyl-3-phenylisoxazolin-5-one, which is a preferred compound of the invention.

The N-substituted-4-formyl-3-isoxazolin-5-one dye intermediates of the invention may be made by reacting dimethylformamide and phosphorous trichloride with the properly substituted isoxazoline compound, which may be made by the procedure described by F. De Sarlo, L. Fabbrini and G. Renzi in "Tetrahedron," 22 (9), 2989–2994 (1966). The dye intermediates of the invention thus formed may then be reacted with the quaternary salt of a cyclic, preferably nitrogen-containing, cyanine dye-forming nucleus. This condensation reaction, which results in the carbon atom of the formyl substituent of the compound of the invention becoming a part of a methine chain linking said compound with the aforesaid cyanine dye-forming nucleus, can be carried out at 100° up to about 150°C., and preferably is conducted at reflux in acetic anhydride (about 140°C.). The reaction time is typically about 10–35 minutes. However, lower temperatures can be used with the reaction proceeding more slowly. The dye intermediate of the invention and the cyanine dye-forming nucleus can be present in any suitable concentrations relative to one another, preferably substantially equivalent molar concentrations.

Suitable cyanine dye-forming nuclei for this reaction include 1,2,3-trisubstituted-imidazo [4,5-b]-pyrido [2,3-b] pyrazinium salt, and the conventional cyanine dye-forming nuclei in the form of salts, including the nuclei disclosed in U.S. Pat. No. 3,674,782, U.S. Pat. No. 3,431,111, and U.S. Pat. No. 3,539,349, the disclosures of which are incorporated herein by reference. As is well known, such nuclei are often comprised of a 5- or 6-membered nitrogen containing heterocyclic ring which may have various intra- and extracyclic substituents. Fused ring and other cyclic compounds which may contain intracyclic nitrogen, oxygen, sulfur and selenium atoms are common, e.g., salts of benzoimidazoquinoxaline, nitrobenzothiazole, nitrobenzoxazole, nitrobenzoselenazole, etc. Various heterocyclic cyanine dye-forming nuclei are described in Mees, *The Theory of the Photographic Process*, The Macmillan Co., pp. 993–1052 (1946).

A particularly preferred class of cyanine dye-forming nuclei is 1,2,3-trisubstituted-imidazo [4,5-b]-pyrido [2,3-b] pyrazinium quaternary salts which upon reaction join said cyanine dye-forming nucleus with the carbon atom of the formyl substituent of the compound of the invention, the preferred substituents on the nitrogen atoms of the 1 and 3 positions of the imidazole ring being independently selected from an acylic hydrocarbon substituent, (e.g., an alkyl group of from 1–18 carbon atoms), alkaryl and aryl groups. The substituent in the 2-position is an alkyl or alkaryl substituent. The resulting dye has an uneven number of carbon atoms between the nitrogen atoms of the cyanine dye-forming nucleus and the compound of the invention. These dyes are particularly useful as desensitizing dyes in direct positive silver halide emulsions.

The preparation of the dye intermediates of the invention and their reaction with cyanine dye-forming nuclei to form quaternated merocyanine dyes is illustrated by the following examples:

EXAMPLE 1

4-Formyl-2-methyl-3-phenylisoxazolin-5-one

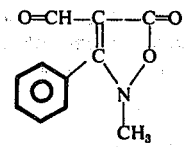

A mixture of 83.8 grams of 2-methyl-3-phenylisoxazolin-5-one, prepared as described by F. De Sarlo, L. Fabbrini and G. Renzi ["Tetrahedron," 22 (9), 2989–2994(1966)], 48.0 ml. of phosphorus trichloride and 196 ml. of dimethylformamide was prepared in the following manner:

A solution of 168 ml. of dimethyl formamide was cooled to 8°C. and the phosphorus trichloride was then added dropwise at such a rate that a temperature of 10°C. was not exceeded and preferably a lower temperature was maintained. This required approximately 45 minutes. To the resulting solution there was added, in about 30 minutes, a solution of 2-methyl-3-phenyl-isoxazolin-5-one in 28 ml. of dimethylformamide, the temperature being maintained at 5°–10°C. during the addition.

The resulting solution was warmed to 45°–48°C and held at this temperature range for 2 hours. The mixture was then poured onto 500 grams of ice. To the mixture there was added a solution of 300 ml of water containing 193 grams of sodium acetate. The resulting solution was warmed to 25°–30°C. at which point the desired product began to crystallize and the temperature rose to 44°C without further heating. After 30 minutes the product was collected and was washed with water. This produced 69.1 grams (74% yield) of 4-formyl-2-methyl-3-phenylisoxazolin-5-one MP 138°–139°C. This compound is used in preparing dyes of the invention as illustrated in Example 2.

EXAMPLE 2

1,3-dimethyl-2-[(2-methyl-5-oxo-3-phenyl-3-isoxazolin-4-yl) vinyl]-imidazo [4,5-b]-pyrido [2,3-b] pyrazinium p-toluenesulfonate:

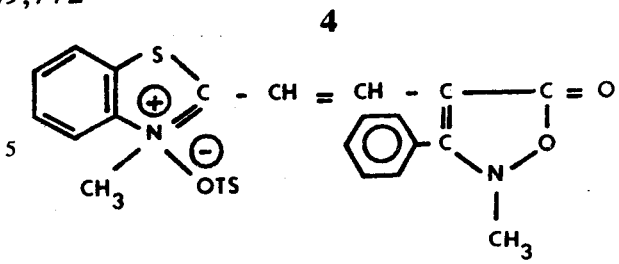

A mixture of 400 mg. of 2,3-dimethyl benzothiazolium tosylate, 350 mg. of 4-formyl-2-methyl-3-phenyl-3-isoxazolin-5-one and 2 ml. of acetic anhydride was heated to reflux for 10 minutes. The resulting dark solution was cooled and was diluted gradually with ethyl acetate. The dye separated as an oil. A small portion of this oil was caused to crystallize with ether. This solid was used to seed the oily mixture which caused the dye to crystallize out as a yellow solid which was collected, washed with ethyl acetate then acetone and then dried to give 450 mg. (74% yield) of yellow dye having a melting point of 215°–220°; via λ Max in ethanol was 422 nm ($\epsilon$=20,600).

EXAMPLE 4

2-[(2-methyl-5-oxo-3-phenyl-3-isoxazolin-4-yl) vinyl]-3-ethylbenzoselenazolinium iodide

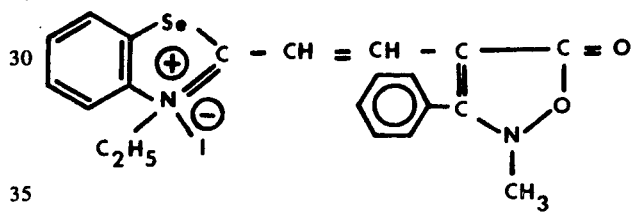

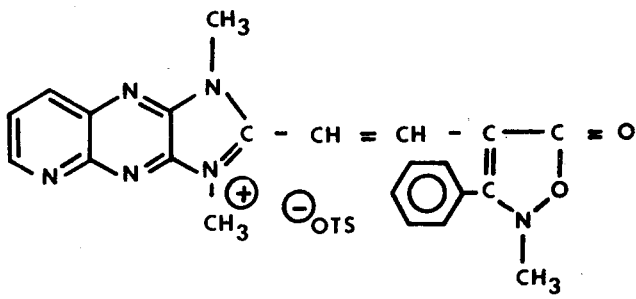

A mixture of 1,2,3-trimethylimidazo [4,5-b]-pyrido [2,3-b] pyrazinium p-toluene sulfonate (100 mg.), 4-formyl-2-methyl-3-phenyl-3-isoxazolin-5-one (100 mg., two equivalents (See Example 4), acetic anhydride (0.5 ml.), and diisopropylethylamine (1 drop) was allowed to stir at 30°C for 18 hours. The mixture was then diluted with 1 ml of methylene chloride, and this solution was poured into 15 ml of ether. The resulting yellow dye (75 mg.) was collected and purified by preparative layer chromatography (silica gel; 1:5 methanol. benzene). This gave 30 mg. of dye of the above formula, which had a λmax in ethanol at 385 nm.

EXAMPLE 3

2-[(2-methyl-5-oxo-3-phenyl-3-isoxazolin-4-yl) vinyl]-3-methylbenzothiazolium tosylate A mixture of 704 mg. of 2-methyl-benzoselenazole ethiodide, 386 mg. of 4-formyl-2-methyl-3-phenyl-3-isoxazolin-5-one and 10 ml. of acetic anhydride was heated to reflux for 15 minutes and then cooled to 25°C. The resulting solid was collected and washed with acetone and then ether. There was obtained 350 mg. (33% yield) of yellow solid, m.p. 211°C. (decomp.); I.R. λ Max in KBr was 1740 cm.$^{-1}$ (>C=O); vis λ Max in ethanol was 442 nm ($\epsilon$=36,000).

EXAMPLE 5

2-[(2-methyl-5-oxo-3-phenyl-3-isoxazolin-4-yl) vinyl]-1-ethylquinolinium iodide

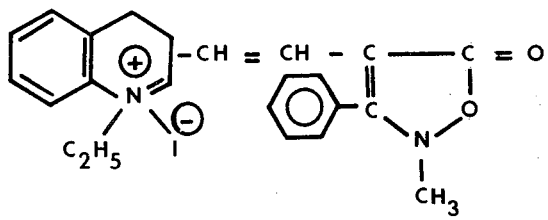

A mixture of 2.99 g. of quinaldine ethiodide, 1.93 g. of 4-formyl-2-methyl-3-phenyl-3-isoxazolin-5-one, 20 ml. of acetic anhydride and 0.4 ml. of N,N-diisopropylethylamine was stirred and heated to reflux for 30 minutes. The hot solution was diluted with ethyl acetate (ca 20 ml.) until crystals began to separate. The mixture was allowed to stand for 18 hours at 25°C. The resulting solid was separated and was washed with ethanol, acetone and then ether. This gave 1.5 g. (32% yield) of dark crystals having a m.p. 210°C. (decomp.). I.R. λ Max in KBr was 1730 cm.$^{-1}$ (>C=O); via λ Max in ethanol was 437 nm. ($\epsilon$ = 19,000).

EXAMPLE 6

4-[(3-ethyl-5-rhodanylidene)-methylene]-3-phenyl-2-methyl-3-isoxazolin-5-one

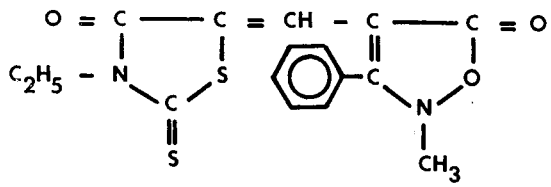

A mixture of 1.61 g. N-ethyl rhodanine, 1.93 g. of 4-formyl-2-methyl-3-phenyl-3-isoxazolin-5-one, 8 ml. of acetic anhydride and 0.1 ml. N,N-diisopropylamine was heated to reflux for 30 minutes during which crystals gradually separated. The mixture was cooled to 25°C. The solid was collected and washed with acetone and then ether and dried giving 1.51 grams (45% yield) of yellow crystals having a melting point of 260°C. (decomp.) I.R. λ Max in KBr was 1740 cm.$^{-1}$ (>C=O); 1690 cm.$^{-1}$ (>C=O); vis λ Max in ethanol was 410 nm. ($\epsilon$ = 33,000).

EXAMPLE 7

2-[(2-methyl-5-oxo-3-phenyl-3-isoxazolin-4-yl) vinyl]-5-methoxy-3-methyl-benzoselenazolium p-toluene sulfonate

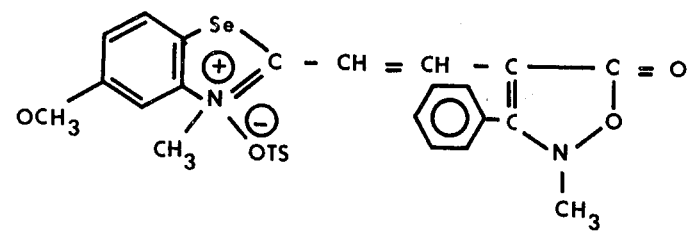

A mixture of 4.12 grams of 2,3-dimethyl-5-methoxy benzoselenazole p-toluent sulfonate, 1.93 grams of 4-formyl-2-methyl-3-phenyl-3-isoxazolin-5-one and 5 ml. of acetic anhydride was heated to reflux for 35 minutes. The resulting hot solution was diluted with 10 ml. of acetone, then with 10 ml. of ethyl acetate while being heated to boiling on a steam bath. This resulted in the formation of yellow crystals which were collected and washed with acetone and ether. This gave 4.4 grams of dye (75% yield) having a melting point of 234°–235°C. (decomp.); λ Max in ethanol was 445 nm. ($\epsilon$ = 28,000).

EXAMPLE 8

2-[(2-methyl-5-oxo-3-phenyl-3-isoxazolin-4-yl) vinyl]-5-bromo-3-methyl benzothiazolinium p-toluene sulfonate

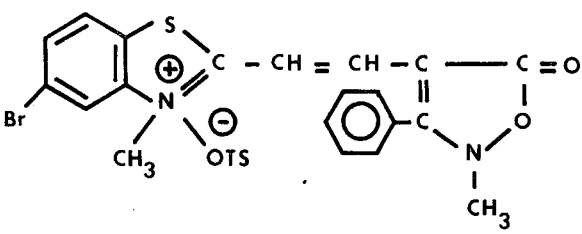

A mixture of 4.14 grams of 2,3-dimethyl-5-bromobenzothiazole p-toluene sulfonate, 1.93 grams of 4-formyl-2-methyl-3-phenyl-3-isoxazolin-5-one and 8.0 ml. of acetic anhydride was heated to reflux for 35 minutes. The resulting hot solution was diluted with 10 ml. of acetone and 20 ml. of ethyl acetate while being heated to boiling on a steam bath. Yellow crystals formed which were collected and washed with acetone and then with ether to give 5 grams of dye having a melting point of 229°–230°C. (decomp.) λ Max in ethanol was 435 nm. ($\epsilon$ = 39,000).

EXAMPLE 9

2-[(2-methyl-5-oxo-3-phenyl-3-isoxazolin-4-yl) vinyl]-5,6-cyclohexylidenedioxy-3-methyl benzothiazolinium tetrafluoroborate

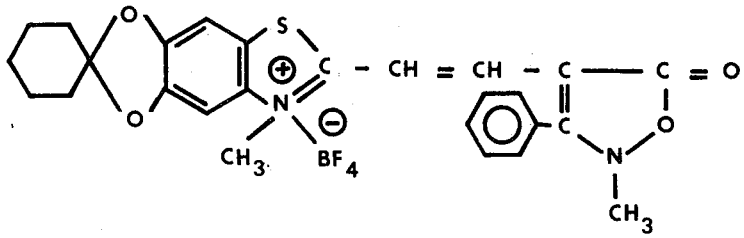

A mixture of 4.47 grams of 2,3-dimethyl-5,6-cyclohexylidenedioxy benzothiazole p-toluene sulfonate, 1.93 grams of 4-formyl-2-methyl-3-phenyl-3-isoxazolin-5-one and 8 ml. of acetic anhydride was heated to reflux for 35 minutes which resulted in a gummy mass which could not be induced to crystallize. The reaction solution was mixed with a solution of 5 grams of sodium tetrafluoroborate in 10 ml. of water. This resulted in an orange solid which was collected and recrystallized from a mixture of 20 ml. of methanol and 75 ml. of isopropyl alcohol to give 1.3 gram (24% yield) of dye having a melting point of 221°–222°C. (decomp.) λ Max in ethanol was 440 nm. ($\epsilon = 26,000$).

EXAMPLE 10

2-[(2-methyl-5-oxo-3-phenyl-3-isoxazolin-4-yl) vinyl]-3,5-dimethyl benzoselenazolinium p-toluene sulfonate

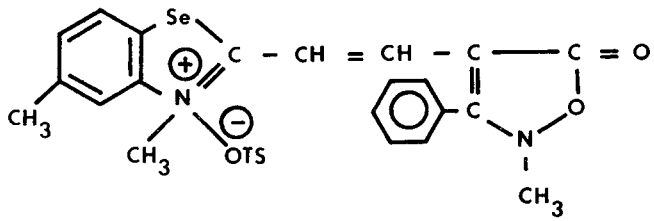

A mixture of 3.96 grams of 2,3,5-trimethylbenzoselenazole p-toluenesulfonate, 1.93 grams of 4-formyl-2-methyl-3-phenyl-3-isoxazolin-5-one and 8 ml. of acetic anhydride was heated to reflux for 35 minutes. The resulting hot solution was diluted with 10 ml. of acetone, then with 10 ml. of ethyl acetate while being heated at boiling on a steam bath. This resulted in the formation of yellow crystals which were collected and washed with acetone and ether to give 4.0 grams (70% yield) of dye having a melting point of 246°C. (decomp.) λ Max in ethanol was 438 nm. ($\epsilon = 34,000$).

EXAMPLE 11

2-[(2-methyl-5-oxo-3-phenyl-3-isoxazolin-4-yl) vinyl]-3-methyl-β-naphthiazolinium p-toluene sulfonate

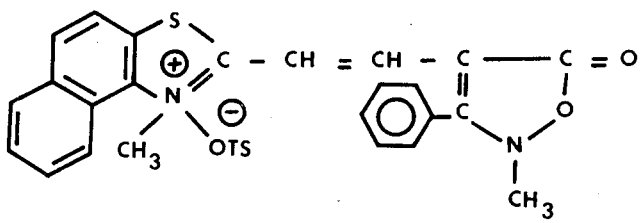

A mixture of 1.80 grams of 2,3-dimethyl-β-naphthiazole p-toluene sulfonate, 0.90 of 4-formyl-2-methyl-3-phenyl-3-isoxazolin-5-one and 4 ml. acetic anhydride was heated to reflux for 35 minutes. The resulting hot solution was diluted with 10 ml. acetone and 10 ml. ethyl acetate while being heated to boiling on a steam bath. Yellow crystals formed which were collected and washed with acetone and ether to give 1.9 grams (73% yield) of dye having a melting point of 230°–231°C. (decomp.) λ Max in ethanol was 434 nm. ($\epsilon = 26,000$).

For the preparation of direct positive gelatinsilver halide emulsions of this invention, the dyes made from the dye intermediates of the invention are advantageously incorporated in the finished emulsion by means of a solvent solution, e.g., 1 gram in one liter of methanol. The type of silver halide emulsions that are advantageously used with the above dyes are direct positive silver halide emulsions which have been chemically fogged in a conventional manner with a reducing agent or in the manner described in Bigelow, U.S. Pat. No. 3,637,392. The emulsions include any of those prepared with hydrophilic colloids, such as natural materials, e.g., gelatin, albumin, agar-agar, gum arabic, alginic acid, etc., and synthetic and its derivatives, e.g., partially hydrolyzed polyvinyl acetates, polyvinyl ethers, and acetals containing a large number of extralinear -$CH_2$-CHOH groups, etc., polyvinyl pyrrolidone, hydrolyzed interpolymers of vinyl acetate and unsaturated addition polymerizable compounds such as maleic anhydride, acrylic and methacrylic acid ethyl esters such as those described in U.S. Pat. Nos. 2,276,322; 2,276,323, and 2,347,811. The useful polyvinyl acetals include polyvinyl butyraldehyde acetal and polyvinyl ortho-sulfobenzaldehyde acetal sodium salt. Other useful colloid binding agents include the hydrophilic copolymers of N-acrylamido alkyl betaines described in Shacklett, U.S. Pat. No. 2,833,050 and hydrophilic cellulose ethers and esters.

The concentration of the dyes described above in the emulsions may be usefully varied from 5 to 1,000 milligrams per mole of silver halide. The concentration will vary depending upon the type of dye, the type of emulsion, and the effects desired. The most effective dye concentration for any given emulsion can be determined by making the tests and observations customarily used in the art of evaluating photographic silver halide emulsions.

The emulsions of this invention may be coated on any suitable base including paper and transparent film supports, for example, films of film-forming polymers such as cellulose derivatives, e.g., cellulose acetate, cellulose triacetate, cellulose mixed esters, etc.; polymerized vinyl compounds, e.g., copolymerized vinyl acetate and vinyl chloride, polystyrene, etc.; and films formed from polyesters made according to the teachings of Alles, U.S. Pat. No. 2,779,684 and a patents referred to in the specification of that patent.

What is claimed is:
1. Dye intermediates having the formula

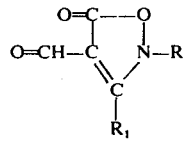

wherein R is selected from alkyl, alkaryl, and aryl and $R_1$ is selected from alkyl, alkaryl, aryl, and hydrogen.

2. Dye intermediates of claim 1 wherein R is lower alkyl.

3. Dye intermediates of claim 1 wherein $R_1$ is aryl.

4. A dye intermediate of claim 1 having the formula:4-formyl-2-methyl-3-phenylisoxazolin-5-one.

5. A method of producing quaternated merocyanine dyes comprising reacting a compound of claim 1 with the quaternary salt of a cyanine dye-forming nucleus.

6. A method according to claim 5 wherein said quaternary salt of a cyanine dye-forming nucleus is a 1,2,3- trisubstituted-imidazo [4,5-b]-pyrido [2,3-b] pyrazinium salt.

7. A method according to claim 6 wherein the substituents on the 1 and 3 positions of the imidazole ring of the pyrazinium salt are independently selected from the group consisting of an acyclic hydrocarbon substituent, an alkaryl substituent and an aryl substituent and the substituent on the 2 position is selected from alkyl and alkaryl substituents.

8. A method according to claim 7, wherein said dye intermediate is 4-formyl-2-methyl-3-phenylisoxazolin-5-one.

9. A method of producing merocyanine dyes comprising reacting a compound of claim 1 with a cyanine dye-forming nucleus.

10. A method according to claim 9 wherein said cyanine dye-forming nucleus is N-ethyl rhodanine.

* * * * *